UNITED STATES PATENT OFFICE.

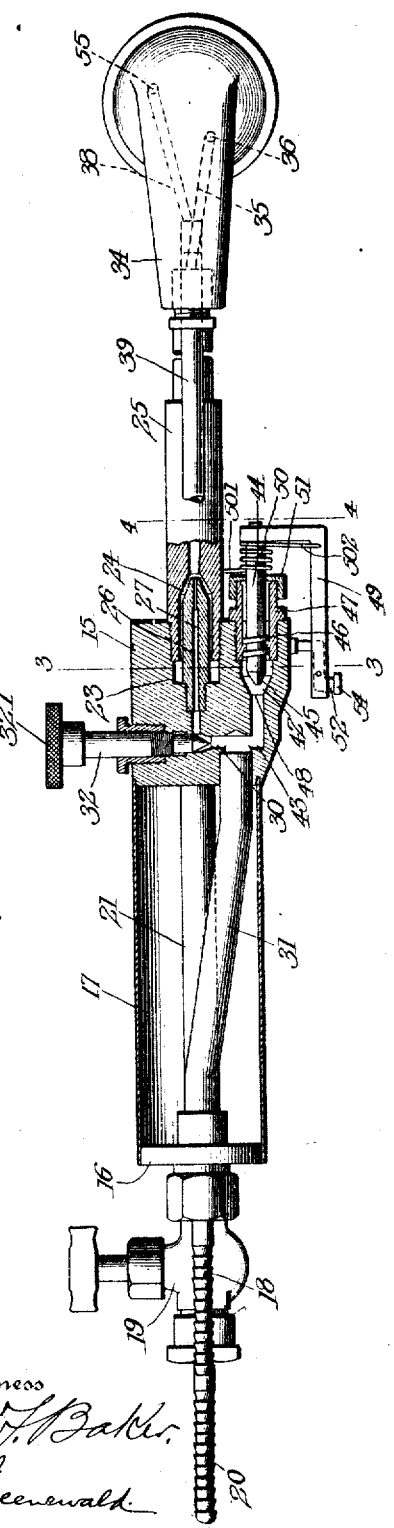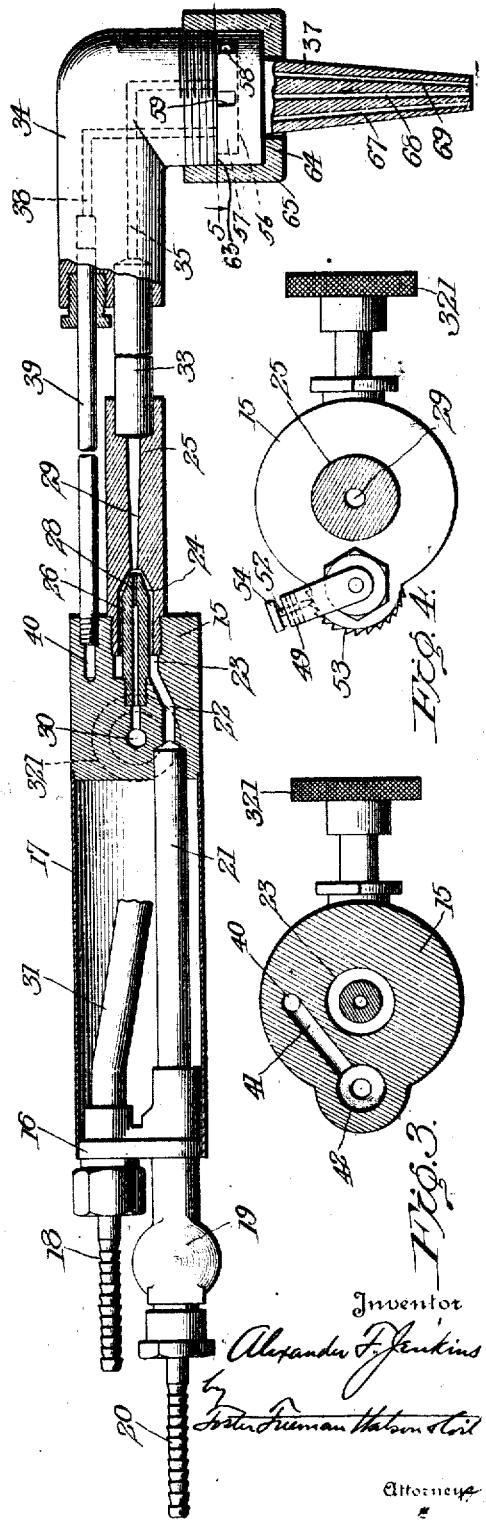

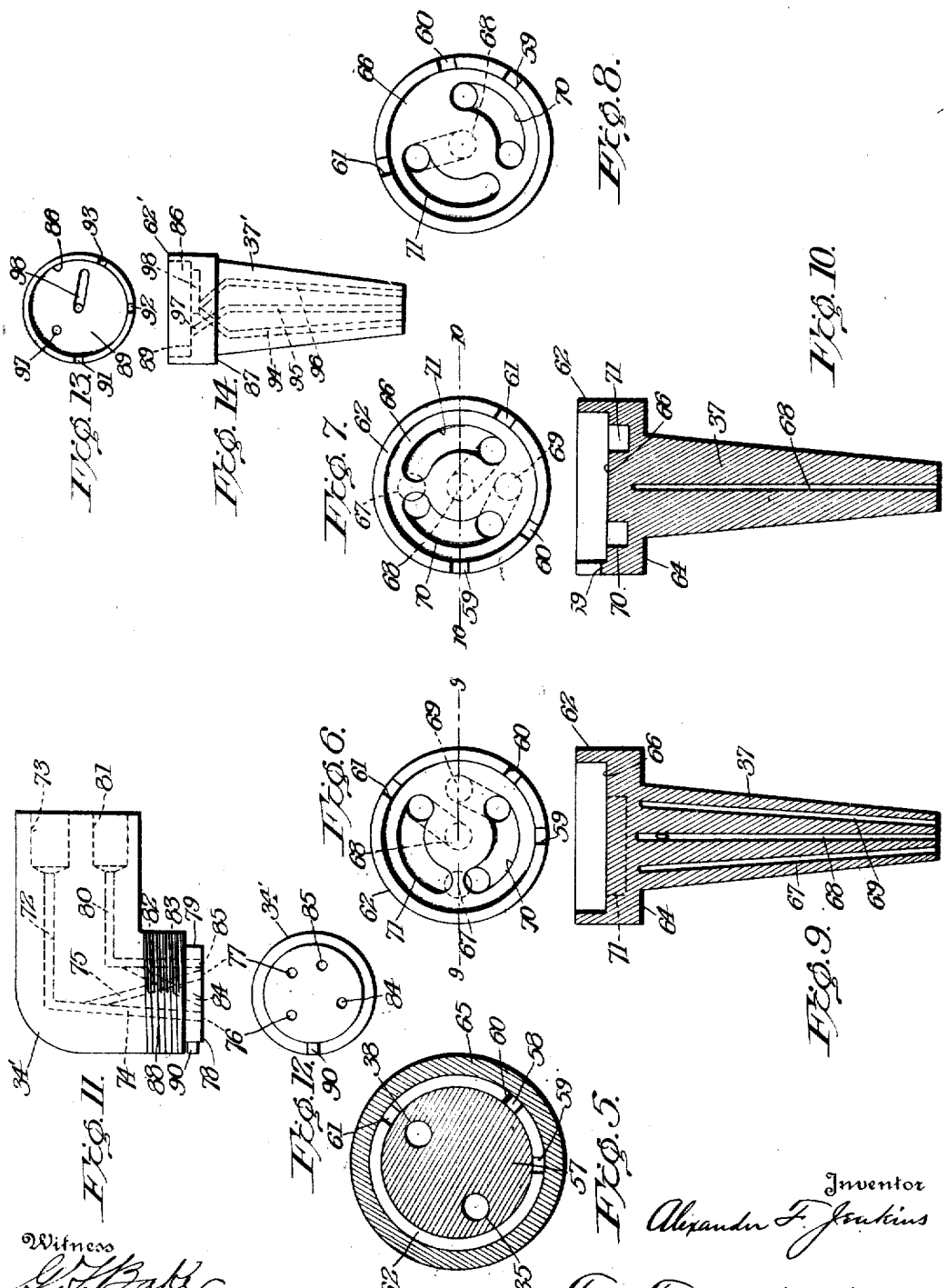

ALEXANDER F. JENKINS, OF BALTIMORE, MARYLAND, ASSIGNOR TO THE ALEXANDER MILBURN COMPANY, OF BALTIMORE, MARYLAND, A CORPORATION OF MARYLAND.

CUTTING AND WELDING TORCH 1,274,052.　　　Specification of Letters Patent.　　Patented July 30, 1918.

Application filed August 10, 1916. Serial No. 114,211.

*To all whom it may concern:*

Be it known that I, ALEXANDER F. JENKINS, a citizen of the United States, and residing at Baltimore, State of Maryland, have invented certain new and useful Improvements in Cutting and Welding Torches, of which the following is a specification.

This invention relates to cutting and welding torches generally and has particular reference to improvements in oxy-acetylene cutting and welding torches in which a mixture of oxygen and acetylene is used for heating the material to be welded when the torch is used for welding purposes, and in which a jet of pure oxygen is used with the preheating gases when the torch is employed for cutting purposes.

The principal object of my invention is to provide a portable appliance of the above type which may by a simple adjustment be converted from a cutting torch into a welding torch or vice versa. It has been the purpose to accomplish this object by using the same torch for both cutting and welding purposes.

Another object has been to provide a simple means for securely attaching the tip to the torch head but which attaching means will admit of ready release for the adjustment of the tip with respect to the torch head.

Another object of the invention is to provide a simple quick acting valve for controlling the supply of cutting oxygen to the torch head.

Other objects and the novel features of my invention will be apparent from the following description taken in connection with the drawing, in which:—

Figure 1 is a top plan view of a torch embodying my invention, parts thereof being broken away, parts being shown in section, and other parts being shown in dotted lines.

Fig. 2 is a side view of the same partly in elevation and partly in section;

Fig. 3 is a transverse cross section on the line 3—3 of Fig. 1;

Fig. 4 is a transverse cross section on the line 4—4 of Fig. 1;

Fig. 5 is a cross section taken on the line 5—5 of Fig. 2 showing the construction of a part of the head and tip.

Figs. 6, 7 and 8 are top plan views of the tip showing its three different positions with respect to the head to which it is attached;

Figs. 9 and 10 are enlarged longitudinal cross sectional views of the tip, the views being taken at right angles to each other through the center of the tip;

Figs. 11 and 12 are respectively a side view of another torch head and a plan of the working face thereof viewed from below, this head also embodying my invention; and Figs. 13 and 14 are respectively a top plan view and a side elevation of a tip attachable to the torch head shown in Figs. 11 and 12, the passages in Figs. 11 and 14 being shown in dotted lines.

Referring to the drawings, and to Figs. 1 and 2 in particular, the torch consists of a handle portion which is made up of a front casting 15 and a rear casting 16 which are connected together and held in spaced relation by a tubular metal shell 17. The rear casting or member 16 has attached to it a coupling 18 to which the oxygen supply pipe or tube is attached and below the coupling 18 there is a valve casing 19 for controlling the flow of acetylene from the coupling 20 to the pipe 21 which leads the acetylene to the passage 22 in the front casting 15. The oxygen supply and acetylene supply are delivered under pressure through tubes which are attached to the coupling members 18 and 20.

The acetylene flows from the passage 22 into the annular chamber 23 which forms a part of the mixing chamber of the torch and continues into an annular chamber 24 in a plug member 25 which is secured into the front end of the casting 15 and constitutes a part of the injector mixing device. The nozzle 26 constitutes the other part of the injector mixing device and extends into the chambers 23 and 24 and is secured at its rear end into the casting 15. The nozzle 26 has a central passage 27 therein which is restricted at 28 and discharges from there into an outwardly flaring coaxial passage 29. The passage 27 in the nozzle 26 carries the oxygen which is mixed in the passage 29 with the acetylene drawn from the chamber 24. The oxygen for the mixture is derived from a passage 30 which connects the passage 27 with a pipe 31 extending through the shell 17 to the rear casting 16 and connected with the coupling member 18. A needle valve 32 is arranged so as to control the flow of oxygen through the passage 30 to the mixing device. The passage 29 of the mixing device is connected at its outer end with a pipe 33 which has its other end connected to the torch head 34, and the mixture from the pipe 33 passes through a mixture passage 35 in the head and is discharged at the outlet 36 into a suitable port in the tip 37.

The torch head 34 also has a passageway 38 therein which is connected by a pipe 39 with a passage 40 in the front casting 15. Referring to Fig. 3, the passage 40 is connected to a passage 41 which leads downwardly and to one side of the mixing chamber 23 and to a valve chamber 42. In Fig. 1 it will be seen that the valve chamber 42 is connected by a passage 43 with the oxygen supply pipe 31. In order to control the flow of oxygen to the cutting oxygen passage 38 in the head, I have provided a quick acting valve which has a stem 44 provided at its inner end with a tapering part 45 to fit the valve seat in the chamber 42. Between its ends, the stem 44 is provided with a comparatively short steep screw thread 46 which fits a corresponding screw thread in an annular member 47 secured into the opening in the casting 15 in which the valve is fitted. The screw thread 46 is rectangular in cross section and comparatively large so as not to bind, and being steep it will quickly open and close the port 48 when the stem 44 is turned. The turning means for the valve consists of a right angle arm 49 which extends rearwardly to a point where it can be engaged by a finger of the hand holding the tool. The arm 49 may be raised and lowered manually as desired but in order to provide for instantly opening the valve a spring 50 is provided which surrounds the valve stem 44 and bears against the cap 51 and also against a part of the arm 49 thus tending to pull the stem outwardly. The ends 501 and 502 of the spring respectively engage the plug member 25 and the handle 49 tending to turn the latter when it is released. The means for locking the valve 44 in closed position consists of a trigger 52 which is pivoted intermediate its ends on the operating arm 49 and has an end which engages the ratchet teeth 53 formed on the casting 15. By pressing against the head 54 of the trigger 52 the end of the same will be drawn out of engagement with the ratchet teeth 53 and the tension of the spring 50 will quickly turn the valve to its open position and admit cutting oxygen to the torch head.

The cutting oxygen passage 38 leads to an outlet 55 which is located in the bottom flat face formed on a reduced portion 57 of the head, the head being L-shaped so as to bring the face 56 parallel to the surface against which the jets are directed. The reduced part 57 of the head has a pin 58 extending laterally therefrom to engage in any one of the notches 59, 60, or 61 in the flange 62 at the upper end of the tip 37. The flange 62 forms a circular recess or socket to receive the reduced portion 57 of the head and its upper edge engages against the shoulder 63 on the head. The tip 37 is provided with an exterior shoulder 64 which is adapted to be engaged by an inturned flange on the threaded locking ring or nut 65 whereby it may be tightly clamped against the head 34 with the face 56 in contact with the surface 66 of the tip.

The tip 37 is provided with three passages 67, 68 and 69 which extend longitudinally of the tip and have alined outlets at the lower end of the tip, the passage 68 extending substantially centrally of the tip throughout most of its length and having its outlet located substantially at the center of the lower end of the tip. The top face 66 of the tip is substantially flat and has two segmental recesses or ports 70 and 71 formed therein. The port 70 is connected by short oblique passages with the passages 67 and 69 whereas the port 71 leads through a short oblique passage to the central passage 68.

When it is desired to have the outlets of the passages 67, 68 and 69 extend longitudinally of the tool, as is the case when cutting toward and away from the operator, the tip is fitted against the head so that the notch 60 thereof will engage the pin 58. This arrangement is illustrated in Fig. 6 and in that position the tip will be locked so that it is prevented from turning in either direction independently of the head. In this position the passages 67 and 69 will discharge jets of preheating gas being connected by the port 70 with the oxygen and acetylene passage 35 of the head 34. The port or recess 71 which is connected to the central passage 68 will register with the outlet 55 in the head 34 and cutting oxygen will issue from the outlet of the passage 68.

By loosening the lock nut 65, dropping the notch 60 out of engagement with the pin 58 and turning the tip through an angle of 90° so as to bring the notch 61 in register with the pin 58 and then raising the tip so that the pin 58 fits in the notch 61 and tightening the lock nut 65, the outlets of the passages 67, 68 and 69 will be adjusted so as to extend in a line transversely of the center line of the torch. This position of outlets is desirable when the torch is used for cutting in a line across a plate of material from left to right or right to left. In this position the recesses or ports 70 and 71 in the top face 66 of the tip will register with the oxygen and acetylene mixture outlet 36 and with the oxygen outlet 55 respectively and the oxygen will issue from the outlet in the passage 68 while the mixture will issue from the outlets of the passages 67 and 69.

By releasing and adjusting the tip as above but instead bringing the pin 58 into engagement with the notch 59, the recess 71 in the top face 66 of the tip will be brought into register with the mixture outlet 36 in the head, and since the recess 71 is in communication with the center passage 68 of the tip the welding or heating mixture from the outlet 36 will flow through the center passage 68 in the tip instead of through the lateral passages 67 and 69. When the tip is adjusted in this position the other port 70 in the face 66 will not register with the oxygen outlet 55 in the torch head but a portion of the flat surface 66 will cover the oxygen outlet 55 and completely block the passage of oxygen through the cutting oxygen passage in the head. By adjusting the tip in the manner last mentioned, the preheating or welding gas is discharged from the most desirable point in the tip, that is, from approximately the center thereof.

In Figs. 11 to 14 I have shown another form of head and tip embodying my invention. The torch head 34' shown in Figs. 11 and 12 is similar in shape to the torch head 34 and may be substituted for it on the tool shown in Figs. 1 and 2. The head 34' has an oxygen passage 72 leading from the pipe socket 73 and provided with branches 74 and 75, terminating in outlets 76 and 77 in the bottom face 78 of the reduced portion 79 of the head. The head 34' also has a passage 80 for the welding gas such as a mixture of oxygen and acetylene. The passage 80 leads from a pipe socket 81 to the branch passages 82 and 83 which terminate in outlets 84 and 85 in the bottom face 78. The reduced part 79 of the head 34' is adapted to fit into the socket 86 formed in the top end of the tip 37' by the flange 62'. The tip 37' has an exterior shoulder 87 engageable by an inturned flange on a locking nut, similar to the locking nut 65, adapted to engage the threads 88 on the head 34' to secure the tip to the head. When the tip is secured to the head, the face 78 on the head will abut against the bottom face 89 in the socket 86 and a pin 90 on the head will engage in one of the three spaced notches 91, 92, or 93 in the flange 62'. The tip has three passages 94, 95 and 96 which extend longitudinally of the tip and terminate in alined outlets at the lower end thereof, the passage 95 extending centrally of the tip throughout most of its length having its outlet at the center of the tip. The tips 37 and 37' are substantially circular in cross section. The inlet port 97 of the passage 95 is located at one side of the center of the top face 89 and it is adapted to register with either one of the outlets 76 or 77 in the head 34' depending on whether the pin 90 is locked in engagement with the notch 91 or 92. The passages 94 and 96 are connected at their upper ends to a common inlet port or recess 98 which extends radially of the top face 89 so that it may receive welding gas from either of the outlets 84 or 85 in the head 34'. This arrangement of ports 97 and 98 provides for adjustment of the outlets of the tip at right angles to each other when the appliance is used for cutting purposes. When it is desired to use the torch for welding or heating only, the tip is adjusted so that the notch 93 is locked in engagement with the pin 90 on the head and in this position it will be seen that the port 97 will register with the outlet 85 so that only a welding mixture flows from the head to the tip and this gas will flow through the central passage 95 and discharge from the central outlet in the tip. In this position both of the oxygen outlets 76 and 77 and the other mixture outlet 84 in the head 34' will be blocked by flat portions of the face 89 so that no gas may escape therefrom and so that the only jet will be a heating or welding jet issuing from the outlet of the passage 95.

It will be seen from the drawings and the foregoing description that I have provided a simple manner of attaching and locking the tip in place on the head. In the arrangements shown, I have provided tips by means of which the oxygen passage in the head may be blocked and the welding gas may be discharged from the central openings in the tips. Furthermore, by means of a single tip and three simple adjustments, it is possible with the devices here shown to change the appliances from cutting torches to welding torches or vice versa. This is an important advantage since it is usually necessary to provide two different torches, one for welding and one for cutting purposes and also to provide different kinds of tips for cutting and welding purposes.

While I have shown and described the invention in detail, I do not wish to be limited to the exact form of construction illustrated as it is obvious that various changes may be resorted to without departing from the spirit of the invention.

Having thus described the invention, what is claimed is:

1. In a combined cutting and welding torch, the combination with a torch head having passages therein for cutting oxygen and for preheating gas or gases, of means whereby said torch is readily changeable from a welding torch to a cutting torch or vice versa, said means including a tip attachable to said head in any one of a plurality of different positions, the cutting oxygen passage in the head being closable by said tip in one of said positions and open in another of said positions which renders the device either a welding torch, or a cutting torch, as desired.

2. In an oxy-acetylene torch, the combination with a torch head having passages therein for cutting oxygen and for preheating gas, of means whereby said torch may be readily changeable from a welding torch to a cutting torch or vice versa, said means comprising a tip attachable to said head in any one of a plurality of different positions, said tip having a plurality of passages extending longitudinally thereof, one of said passages having its outlet at the lower end of the tip, said tip being so constructed and adjustable that either the cutting oxygen or the preheating gas will discharge from said outlet in the tip, the cutting oxygen passage in the head being closable by said tip when the tip is adjusted so that the preheating gas discharges from said central outlet.

3. In an oxy-acetylene cutting and welding torch, the combination with a torch head having passages therein for cutting oxygen and for a mixture of oxygen and acetylene, of means whereby said torch is readily convertible from a welding torch to a cutting torch or vice versa, said means comprising a tip having a plurality of passages extending longitudinally thereof, one of said passages having its discharge outlet located substantially at the center of the lower end of the tip, and means for attaching said tip to said head in any one of a plurality of different positions, the cutting oxygen being discharged from said central outlet in the tip when the tip is in one position and the mixture of acetylene and oxygen being discharged from said central outlet when the tip is in a different position.

4. In an oxy-acetylene cutting and welding torch, the combination with a torch head having passages therein for cutting oxygen and for a mixture of oxygen and acetylene, of means whereby said torch is readily convertible from a welding torch to a cutting torch or vice versa, said means comprising a tip having a plurality of passages extending longitudinally thereof, one of said passages having its discharge outlet located substantially at the center of the lower end of the tip, a nut for securing the tip to the head, and means for locking said tip in any one of a plurality of different positions, the cutting oxygen being discharged from said central outlet in the tip when the tip is in one position and the mixture of acetylene and oxygen being discharged from said central outlet when the tip is in a different position.

5. In a welding and cutting torch, the combination of a head having passages therein for oxygen and for a mixture of oxygen and acetylene, a tip having two or more passages therein, one of which is disposed centrally of the tip throughout most of its length and at its outlet, and means whereby the tip may be clamped to said head so as to connect said central passage to either of the passages in the head.

6. In a welding and cutting torch, the combination of a head having two passages therein, one for oxygen and the other for a mixture of oxygen and acetylene, a tip having two or more passages therein, one of which is disposed centrally of the tip throughout most of its length and at its outlet, and means whereby the tip may be clamped to said head so as to connect the oxygen and mixture passages in the head to the central and other passage or passages in the tip respectively, said tip being constructed and adjustable so as to close the oxygen passage in the head and to connect the mixture passage in the head to the central passage of the tip.

7. In a torch, the combination with a torch head having passages therein for cutting oxygen and for preheating gas or gases, of a tip provided with a passage extending longitudinally thereof, said head and tip having interlocking members arranged and adapted to locate and hold the tip in any one of a plurality of positions relatively to the head, and means for securing the tip to the head in any one of such positions, for the purpose set forth.

8. In an oxy-acetylene torch, the combination with a torch head having passages therein for cutting oxygen and for preheating gas or gases, of a tip provided with a passage extending longitudinally thereof and means for securing said tip to said head in any one of a plurality of positions to bring said passage in the tip into communication with either of the passages in the head, said securing means comprising a pin and notch connection between the tip and head to prevent the turning of the tip in either direction independently of the head when the parts are secured together, and a locking ring for clamping the tip against the head.

9. In a torch, the combination with a torch head having passages therein for cutting oxygen and for preheating gas or gases, of a tip provided with a passage extending longitudinally thereof, said head and tip having a coöperating projection and series of notches arranged and adapted to locate and hold the tip in any one of a plurality of positions relatively to the head, and means for securing the tip to the head in any one of such positions, for the purpose set forth.

10. In a torch, the combination with a torch head having passages therein for cutting oxygen and for preheating gas or gases, of a tip provided with a plurality of passages extending longitudinally thereof and having three alined discharge outlets at the lower end thereof, and means for securing said tip to said head with said three outlets in either one of two positions at right angles to each other, said tip being so constructed and adjustable as to bring the passage thereof having the central outlet into communiration with either of the passages in the head.

11. In a torch, the combination with a torch head having passages therein for cutting oxygen and for preheating gas or gases, of a tip having a recess in the top thereof and a passage extending longitudinally of the tip from said recess and having its outlet at the lower end of the tip, and means for securing said tip to said head, a part of the top of said tip being adapted to completely block the cutting oxygen passage, the tip being so constructed and adjustable as to bring said recess in register with one or more of said passages in the head.

12. In a torch, the combination with a torch head having passages therein for cutting oxygen and for preheating gases, of a tip provided with a plurality of ports in the top thereof, said tip also having passages connected with said ports and provided with outlets at the lower end of the tip, and means for securing said tip to said head, said tip and head being so constructed and relatively adjustable as to bring one of said ports into communication with either the cutting oxygen or preheating gas passages in the head.

13. In a torch, the combination with a torch head, of a tip having an exterior shoulder near its upper end, a device for clamping the tip to the torch head, and coöperating means on said head and tip for locking the tip in any one of a plurality of positions to prevent it from turning in either direction with respect to the torch head when clamped thereto, for the purpose set forth.

14. In a torch, the combination with a torch head, of a tip having an exterior shoulder near its upper end and having gas passages extending longitudinally thereof and recesses in the top communicating with said passages, a nut for clamping the tip to the head, and coöperating means on said head and tip for locking the tip in any one of a plurality of positions to prevent it from turning in either direction relatively to the torch head when the tip is attached to the head.

15. In a torch, the combination with a torch head, of a tip, means near the upper end of said tip adapted to coöperate with a suitable device for clamping the tip to the torch head, said tip having also a plane upper face and passages extending longitudinally thereof ending at the bottom of the tip in a series of discharge outlets, the intermediate outlet being located substantially at the center of the end of the tip, and two ports or recesses in the upper face of the tip, one of said ports communicating through one of said passageways with the central outlet and the other port communicating with the other two outlets, and means for clamping said tip to said head.

16. In a welding and cutting torch, the combination with a torch head having passages therein for cutting oxygen and for preheating gas or gases, of a tip provided with a passage having a substantially radial inlet port in its top face and an outlet at the lower end thereof, a part of said top face being adapted to completely obstruct the outlet of the cutting oxygen passage, said inlet port being adapted to receive gas from one of the passages in the torch head.

17. A tip for oxy-acetylene or similar torches, said tip having a flat upper face and having an elongated substantially radial outlet port in said face, and a passage extending longitudinally through said tip and opening into said port at one end thereof.

18. In an oxy-acetylene torch, the combination with a torch head having a passage therein for cutting oxygen, and two passages for preheating gas or gases, said passages opening in the face of a reduced portion of said torch head, of a tip provided with a socket adapted to receive the reduced portion of said head, and also provided with a passage having an inlet in the bottom of said socket and an outlet at the lower end of the tip, the inlet of the passage in the tip being adjustable to receive gas from either one of the preheating gas passages in the head, and means for securing said tip to said head.

19. In an oxy-acetylene torch, the combination with a torch head having passages therein for cutting oxygen and for preheating gas or gases, said passages opening in the face of a reduced portion of said torch head, of a tip provided with a socket adapted to receive the reduced portion of said head, and also provided with a passage having an outlet at its lower end centrally of the tip and an inlet in the socket at the upper end of the tip, the tip and head being relatively adjustable so as to bring said inlet into position to receive gas from either of the passages in said head, and means for securing said tip to said head.

20. In a torch, the combination with a head having a passage therein for preheating gas or gases, of a tip having a flat upper surface and having a passage therein provided with an inlet in its upper surface and an outlet at the lower end, and means for securing the tip to the head so that the inlet of the tip portion will be disposed out of register with the outlet of the passage in the head so as to arrest a flash-back and check it before it goes back into the torch proper.

21. In a welding and cutting torch, the combination with a torch head having passages therein for cutting oxygen and for a mixture of oxygen and acetylene, of a tip provided with a gas passage extending longitudinally thereof, and means for securing said tip to said head in any one of a plurality of positions, said means including a pin and notch locking connection between the head and the tip.

22. In an oxy-acetylene torch, the combination with a torch head having passages therein for cutting oxygen and for preheating gas or gases, of a tip provided with a socket adapted to fit said head and also provided with a passage having an inlet in the bottom of said socket and an outlet at the lower end of the tip, the inlet of the passage in the tip being adjustable to receive gas from either one of the passages in the head, and means for securing said tip to said head.

23. In a combined cutting and welding torch, the combination with a torch head having passages therein for cutting oxygen and preheating gas or gases, of means whereby said torch is readily changeable from a welding torch to a cutting torch or vice versa, said means including a tip attachable to said head in any one of a plurality of different positions, said tip constituting a cutting tip when in one position, and a welding tip when in another position.

In testimony whereof I affix my signature.

ALEXANDER F. JENKINS.